(12) United States Patent
Wada et al.

(10) Patent No.: US 7,048,291 B2
(45) Date of Patent: *May 23, 2006

(54) FRONT FORK IN TWO-WHEELED VEHICLE OR THE LIKE

(75) Inventors: Kazuo Wada, Shizuoka (JP); Shinichi Oba, Shizuoka (JP); Takao Tomonaga, Shizuoka (JP); Koichi Nakano, Shizuoka (JP)

(73) Assignee: Showa Corporation, Gyoda (JP)

( * ) Notice: Subject to any disclaimer, the term of this patent is extended or adjusted under 35 U.S.C. 154(b) by 148 days.

This patent is subject to a terminal disclaimer.

(21) Appl. No.: 10/863,071

(22) Filed: Jun. 8, 2004

(65) Prior Publication Data

US 2005/0074189 A1 Apr. 7, 2005

Related U.S. Application Data

(63) Continuation-in-part of application No. 10/722,258, filed on Nov. 25, 2003.

(30) Foreign Application Priority Data

| Jun. 10, 2003 | (JP) | .................................... 2003-165729 |
| Mar. 22, 2004 | (JP) | .................................... 2004-083554 |
| May 14, 2004 | (JP) | .................................... 2004-145537 |

(51) Int. Cl.
*B62K 21/00* (2006.01)

(52) U.S. Cl. ........................................................ 280/276
(58) Field of Classification Search ....................... None
See application file for complete search history.

*Primary Examiner*—Avraham Lerner

(57) ABSTRACT

A front fork in a two-wheeled vehicle or the like, wherein an annular groove in which both end portions in an axial direction are closed is formed in an upper inner periphery of an outer tube. An annular bush having a closed gap in a free state is attached to the annular groove. An annular gap between an inner periphery of the outer tube and an outer periphery of the inner tube forms a smaller thickness than the bush.

5 Claims, 14 Drawing Sheets

FRONT FORK IN TWO-WHEELED VEHICLE OR THE LIKE

This application is a Continuation-in-Part of U.S. application Ser. No. 10/722,258 filed Nov. 25, 2003.

BACKGROUND OF THE INVENTION

1. Field of the Invention

The present invention relates to a front fork in a two-wheeled vehicle or the like. An attachment portion for a bush guiding an inner tube is formed in upper and lower sides of an outer tube.

2. Description of the Related Art

In Japanese Utility Model Application Publication No. 2541848 (reference document 1), there is disclosed a front fork in which an upper bearing attachment portion 41 constituted by a step portion open to an upper side is formed in an inner periphery of a vehicle body side tube 1. The upper bearing attachment portion 41 is formed by partly cutting the inner periphery of the vehicle body side tube 1 along an axial direction from the upper side and leaving the step portion. An upper bearing member 4 is inserted to the upper bearing attachment portion 41 from an upper direction so as to be assembled in the upper bearing attachment portion 41.

In the front fork, in the reference document 1, it is necessary to cut a long portion extending along an axial direction from an upper end portion of the inner periphery of the vehicle body side tube to the upper bearing attachment portion 41. Working time is extended, and working efficiency is deteriorated.

Further, the upper bearing member 4 is assembled in the upper bearing attachment portion 41 by press fitting. However, since the upper bearing attachment portion 41 has no means for preventing the upper bearing member 4 from coming off to the upper side, there is risk that displacement may occur, such as the upper bearing member 4 coming off to the upper side during use.

SUMMARY OF THE INVENTION

An object of the present invention in an inverted type front fork in a two-wheeled vehicle or the like is to improve the working efficiency of an attachment portion for an upper bush formed in an inner periphery of an outer tube, and to prevent the upper bush from being displaced in an axial direction.

An object of the present invention in a normal type front fork in a two-wheeled vehicle or the like is to improve the working efficiency of an attachment portion for a lower bush formed in an inner periphery of an outer tube, and to prevent the lower bush from being displaced in an axial direction.

The present invention relates to an inverted type front fork in a two-wheeled vehicle or the like in which an attachment portion for a bush guiding an inner tube in a side of an axle is formed in upper and lower sides of an inner periphery of an outer tube in a side of a vehicle body. An annular groove in which both end portions in an axial direction are closed is formed in an upper inner periphery of the outer tube, and an annular bush having a closed gap in a free state is attached to the annular groove. An annular gap between an inner periphery of the outer tube and an outer periphery of the inner tube is formed smaller than the thickness of the bush.

The present invention relates to a normal type front fork usable in a two-wheeled vehicle or the like comprising an attachment portion for a bush guiding an inner tube in a side of a vehicle body disposed in upper and lower sides of an inner periphery of an outer tube in a side of an axle. An annular groove in which both end portions in an axial direction are closed is disposed in a lower inner periphery of the outer tube. An annular bush having a closed gap in a free state is attached to the annular groove. An annular gap between an inner periphery of the outer tube and an outer periphery of the inner tube is smaller in dimension than the thickness of the bush.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 3A and 3B show an outer tube, in which FIG. 3A is a general cross sectional view and FIG. 3B is an enlarged cross sectional view of a main portion;

FIGS. 5A and 5B show a bush, in which FIG. 5A is a front elevational view and FIG. 5B is an end elevational view;

FIGS. 12A and 12B show a bush, in which FIG. 12A is a front elevational view and FIG. 12B is a plan view;

DESCRIPTION OF THE PREFERRED EMBODIMENTS

Embodiment 1, FIG. 1 to FIG. 7 and FIG. 16

Figure 1:
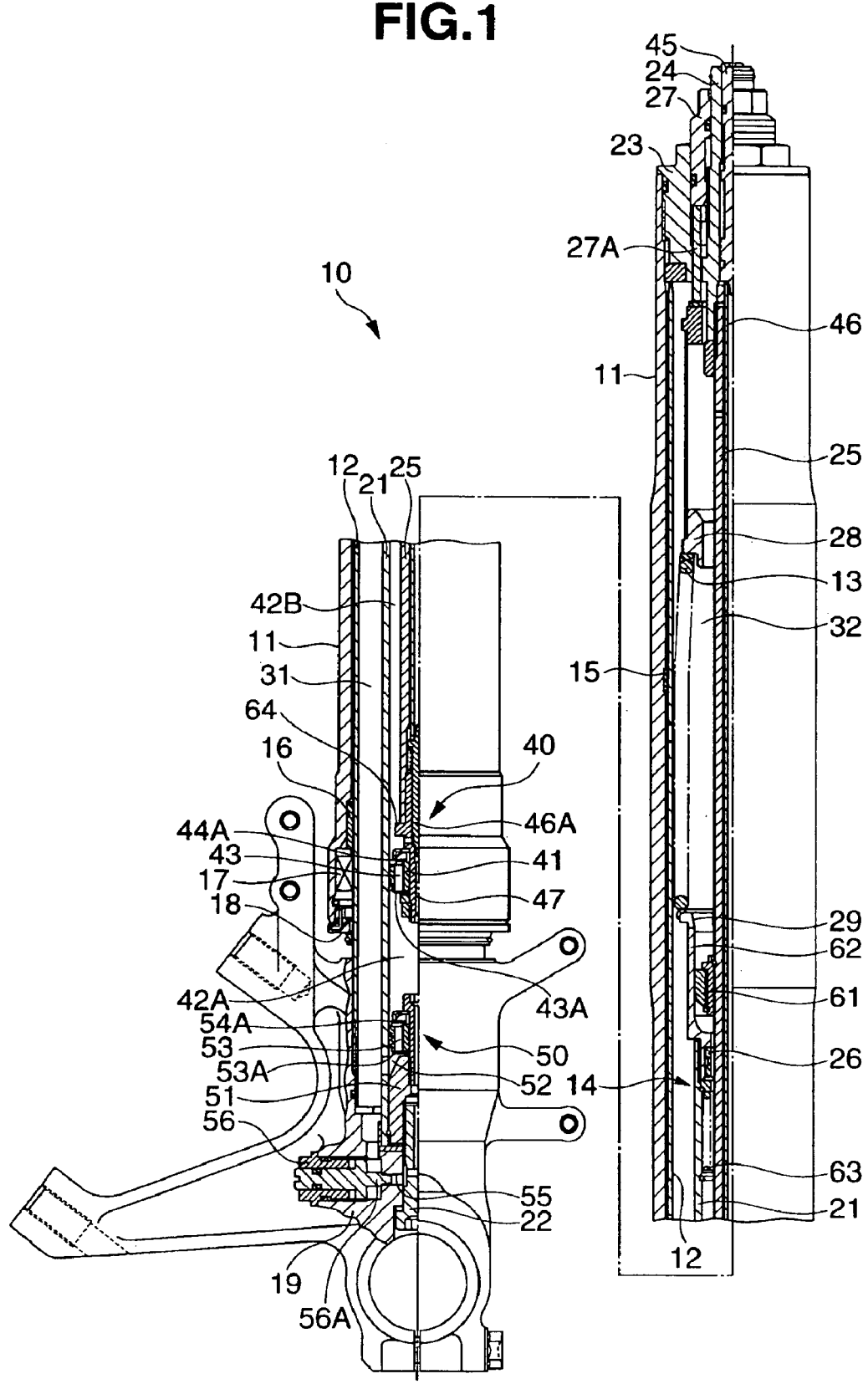
FIG. 1 is a general cross sectional view showing a front fork.
Figure 2:
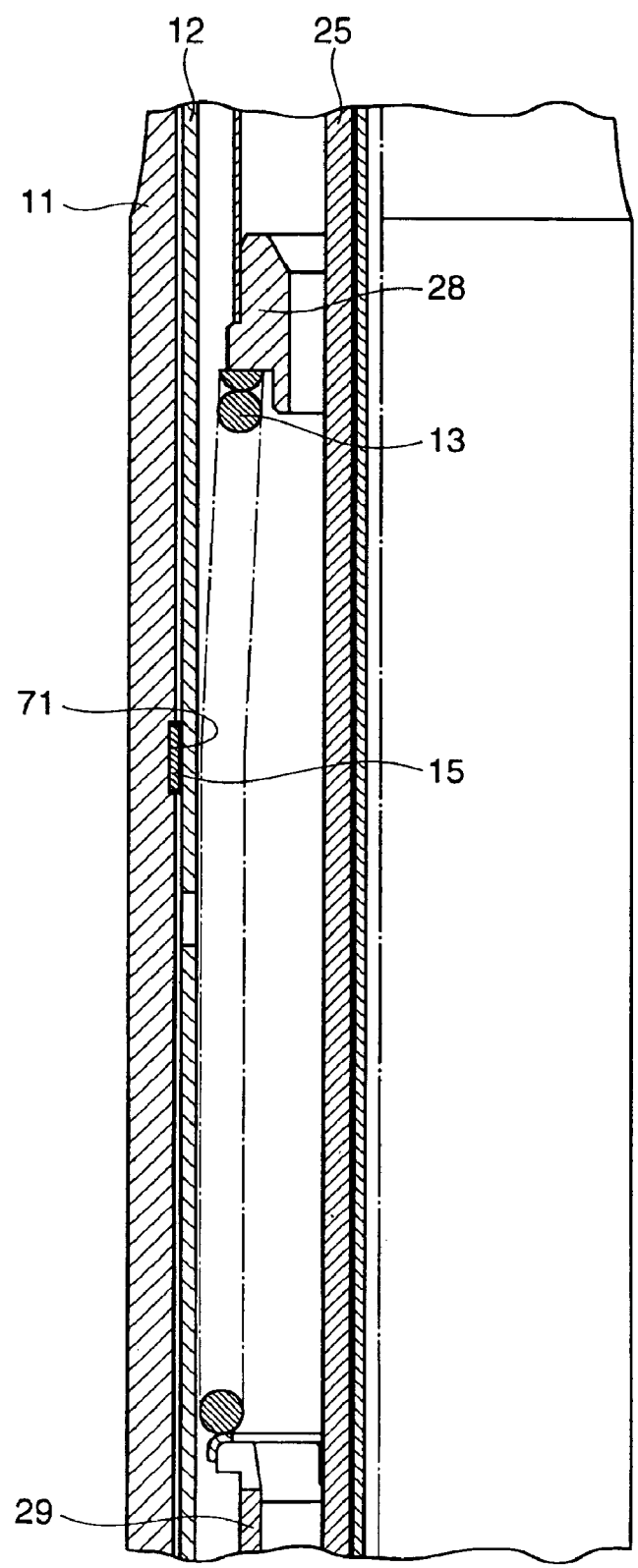
FIG. 2 is a cross sectional view showing a portion around an upper bush in an enlarged manner.
Figure 3A:
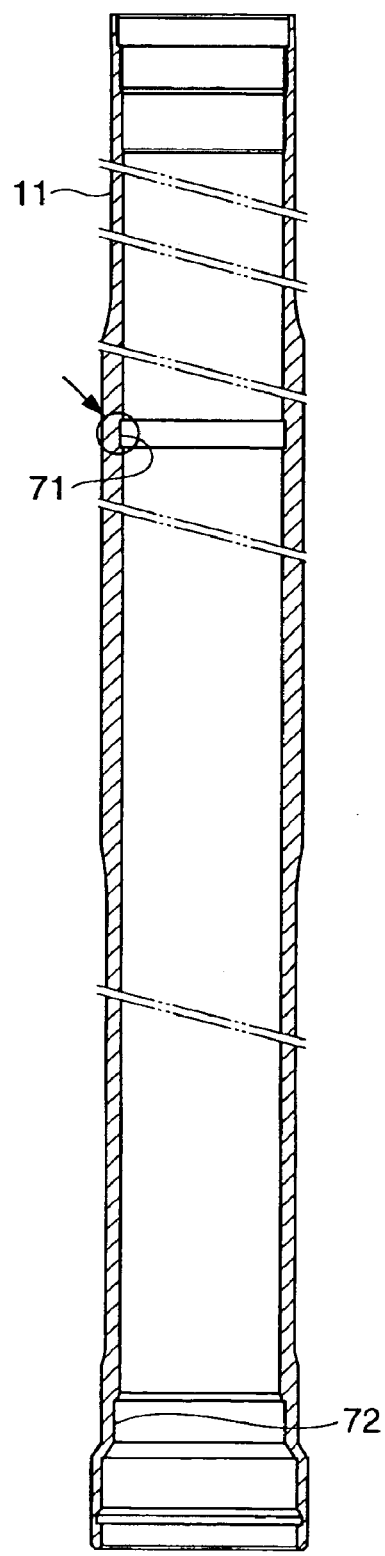
Figure 3B:
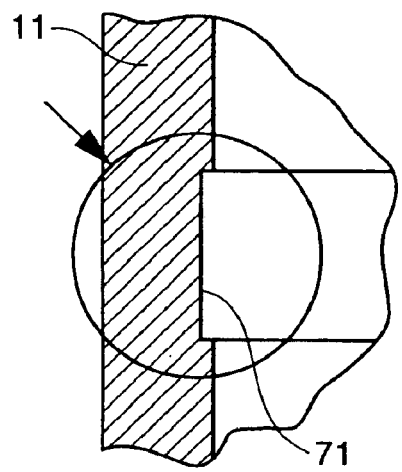
Figure 4:
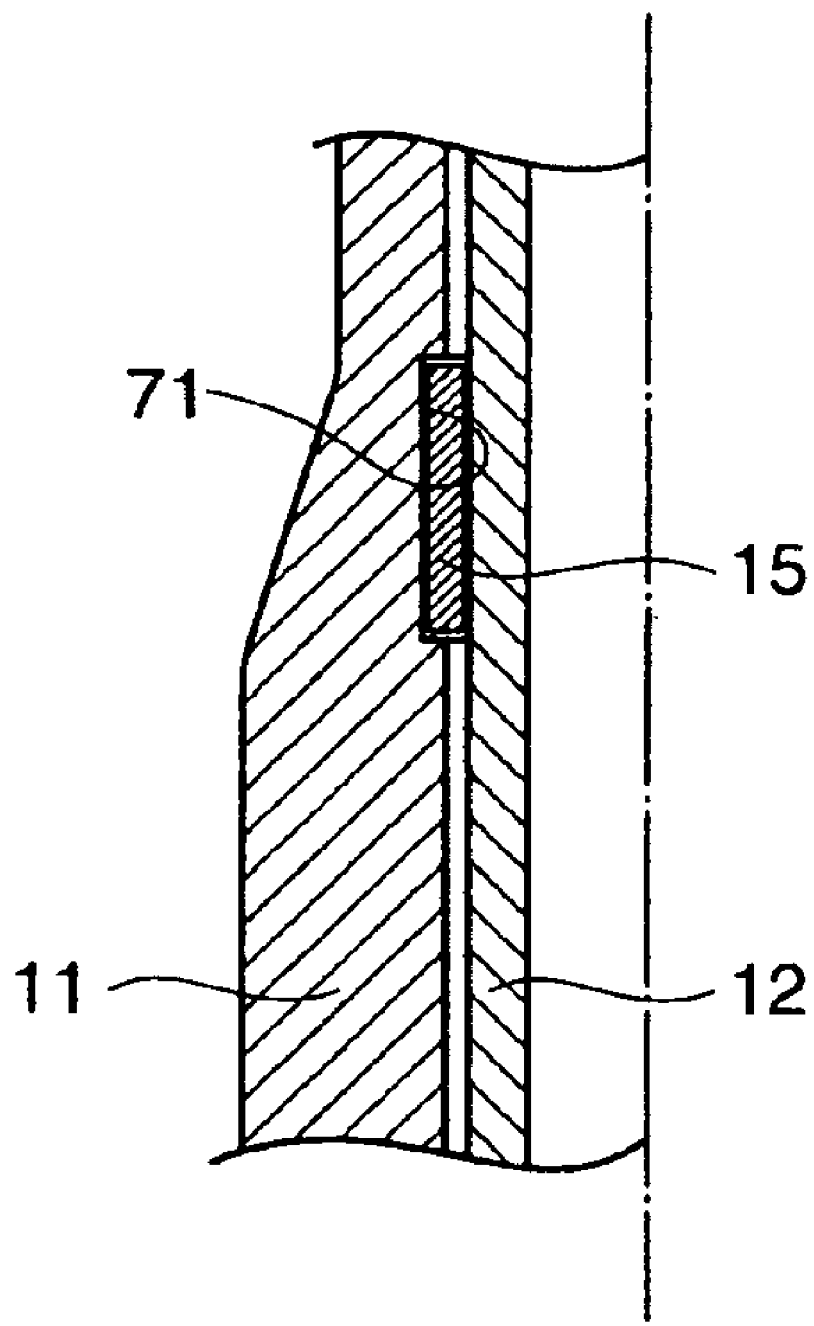
FIG. 4 is a schematic view showing an attachment portion of the upper bush.

An inverted type front fork 10 in a two-wheeled vehicle or the like comprises, as shown in FIG. 1, an inner tube 12 in a side of an axle slidably inserted to an outer tube 11 in a side of a vehicle body so as to be inverted. A suspension spring 13 is interposed between both the tubes 11 and 12, and a single tube type damper 14 is internally provided in a normally erected state.

Upper and lower bushes 15 and 16 guiding the inner tube 12 are fitted and attached to two positions at upper and lower positions in an inner periphery of the outer tube 11. An oil seal 17 and a dust seal 18 are fitted and attached to an inner peripheral portion of a lower end of the outer tube 11.

The outer tube 11 is supported to the side of the vehicle body via upper and lower brackets (not shown). The inner tube 12 is connected to the axle via an axle bracket 19.

A lower end portion of a damper cylinder 21 in the damper 14 is fixed to a bottom portion of the axle bracket 19 by a bottom bolt 22 so as to be provided in a rising manner. A cap 23 is screwed to an upper end portion of the outer tube 11. A hollow piston rod 25 is screwed to a rod connection portion 24 provided in a center portion of the cap 23. A leading end portion of the piston rod 25 is inserted to an inner portion of the damper cylinder 21 while guiding along an inner periphery of a rod guide 26 provided in an upper end opening portion of the damper cylinder 21 in a slidably contacting manner.

A spring load adjusting sleeve 27 is screwed to a portion in the periphery of the rod connection portion 24 of the cap 23. A pushing rod 27A pushed by the spring load adjusting sleeve 27 supports a spring receiver 28 in an inner portion of the outer tube 11. A spring receiver 29 is press fitted to an upper end outer peripheral portion of the damper cylinder 21, in the inner portion of the inner tube 12. The suspension spring 13 mentioned above is interposed between the spring receiver 28 and the spring receiver 29. The spring receiver 28 is vertically moved on the basis of a rotating operation of the spring load adjusting sleeve 27. It is thereby possible to adjust an initial load of the suspension spring 13.

An oil reservoir chamber 31 and a gas chamber 32 are provided in an outer peripheral portion of the damper cylinder 21, in the inner portion of the outer tube 11 and the inner tube 12. A working fluid in the oil reservoir chamber 31 contributes to lubrication in the bushes 15 and 16. The suspension spring 13 and a gas spring in the gas chamber 32 absorb an impact force applied to the vehicle from a road surface.

The damper 14 has a piston valve apparatus 40 (an expansion side damping force generating apparatus) and a bottom valve apparatus 50 (a compression side damping force generating apparatus). The damper 14 damps an expansion and contracting vibration of the outer tube 11 and the inner tube 12 generated according to the absorption of the impact force by the suspension spring 13 and the gas spring, on the basis of the damping force generated by the piston valve apparatus 40 and the bottom valve apparatus 50.

The piston valve apparatus 40 comprises the inner portion of the damper cylinder 21 sectioned into a piston side oil chamber 42A and a rod side oil chamber 42B by a piston 41 fixed to the leading end portion of the piston rod 25. An expansion side disc valve 43A and a compression side check valve 44A are provided respectively in an expansion side flow passage 43 and a compression side flow passage 44 which can communicate the piston side oil chamber 42A with the rod side oil chamber 42B.

The piston valve apparatus 40 comprises a damping force adjusting rod 45 provided in an inner peripheral side of the rod connection portion 24. A damping force adjusting tube 46 fixed to the damping force adjusting rod 45 is passed through a hollow portion of the piston rod 25. A flow passage area of a bypass passage 47 for the piston side oil chamber 42A and the rod side oil chamber 42B provided in the piston 41 can be adjusted by a leading end needle 46A of the damping force adjusting tube 46.

The bottom valve apparatus 50 has a bottom piece 51 screwed to the bottom bolt 22 so as to arrange the damper cylinder 21 in the bottom portion of the axle bracket 19 in a rising manner as mentioned above. The bottom valve apparatus 50 forms a bottom valve chamber 52 below the piston side oil chamber 42A in a sectioning manner. The bottom valve chamber 52 is communicated with the oil reservoir chamber 31 by an oil hole provided in the damper cylinder 21. The bottom piece 51 is provided with a compression side disc valve 53A and an expansion side disc valve 54A respectively in the compression side flow passage 53 and the expansion side flow passage 54, which can communicate the piston side oil chamber 42A with the bottom valve chamber 52.

The bottom valve apparatus 50 is provided with a bypass passage 55 for the piston side oil chamber 42A and the oil reservoir chamber 31 in the axle bracket 19, the bottom bolt 22 and the bottom piece 51. A flow passage area of the bypass passage 55 is adjustable by a leading end needle 56A of a damping force adjusting rod 56 screwed to the axle bracket 19.

Accordingly, the front fork 10 performs a damping operation in the following manner.

Compression Time

During compression of the front fork 10, the compression side damping force is generated in the bottom valve apparatus 50 by the fluid flowing through the compression side disc valve 53A of the compression side flow passage 53 or the needle 56A of the bypass passage 55. The damping force is generated at a low level in the piston valve apparatus 40.

Expansion Time

During expansion of the front fork 10, the expansion side damping force is generated in the piston valve apparatus 40 by the fluid flowing through the expansion side disc valve 43A of the expansion side flow passage 43 or the needle 46A of the bypass passage 47. The damping force is generated at a low level in the bottom valve apparatus 50.

In this case, during maximum compression of the front fork 10, the damping during maximum compression is achieved in the outer side of the damping cylinder 21 by fitting an oil lock piece 61 provided in the piston rod 25 to an oil lock collar 62 integrally provided in the spring receiver 29 of the leading end outer peripheral portion of the damper cylinder 21 and compressing an oil lock oil chamber of the oil lock collar 62.

During maximum expansion of the front fork 10, the damping during maximum expansion is achieved by bringing a rebound spring 63 arranged in the upper end inner peripheral portion of the damper cylinder 21 into contact with a spring stopper 64 in a side of the piston 41 provided in the leading end portion of the piston rod 25.

Figure 5A:
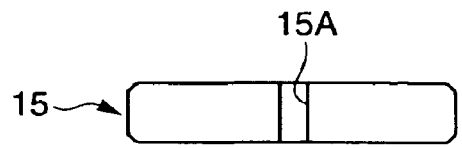
Figure 5B:
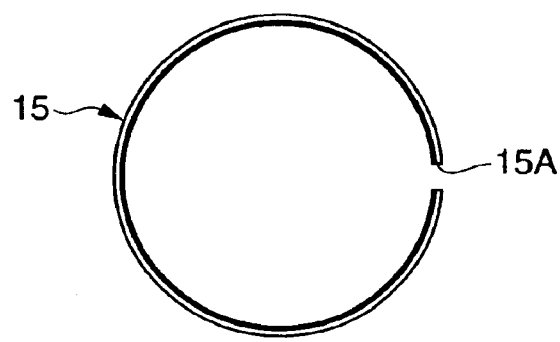

Accordingly, in the front fork 10, as shown in FIGS. 1 to 4, an annular groove 71 is formed in the upper inner periphery of the outer tube 11 by a cutting operation, and the annular upper bush 15 is attached to the annular groove 71. The annular groove 71 comprises a recess groove in which both end portions in an axial direction are closed by a step within the inner peripheral surface of the outer tube 11. The upper bush 15 comprises an annular body as shown in FIGS. 5A and 5B, wherein it is possible to form a closed gap 15A formed in a straight shape along an axial direction of the bush 15, and is attached to an annular groove 71 in a state of having the closed gap 15A. The upper bush 15 is inserted from the upper end opening portion of the outer tube 11 in an elastically compressed state with respect to an inner diameter of the outer tube 11, and is elastically expanded with respect to a groove bottom of the annular groove 71.

In the assembled state of the front fork 10, an annular gap between the inner periphery of the outer tube 11 and the outer periphery of the inner tube 12 is formed smaller than the thickness of the upper bush 15.

In this case, in the lower inner periphery of the outer tube 11, the lower bush 16 is attached to an attachment portion 72 cut so as to open the lower end side in a press fitted state.

Figure 16:
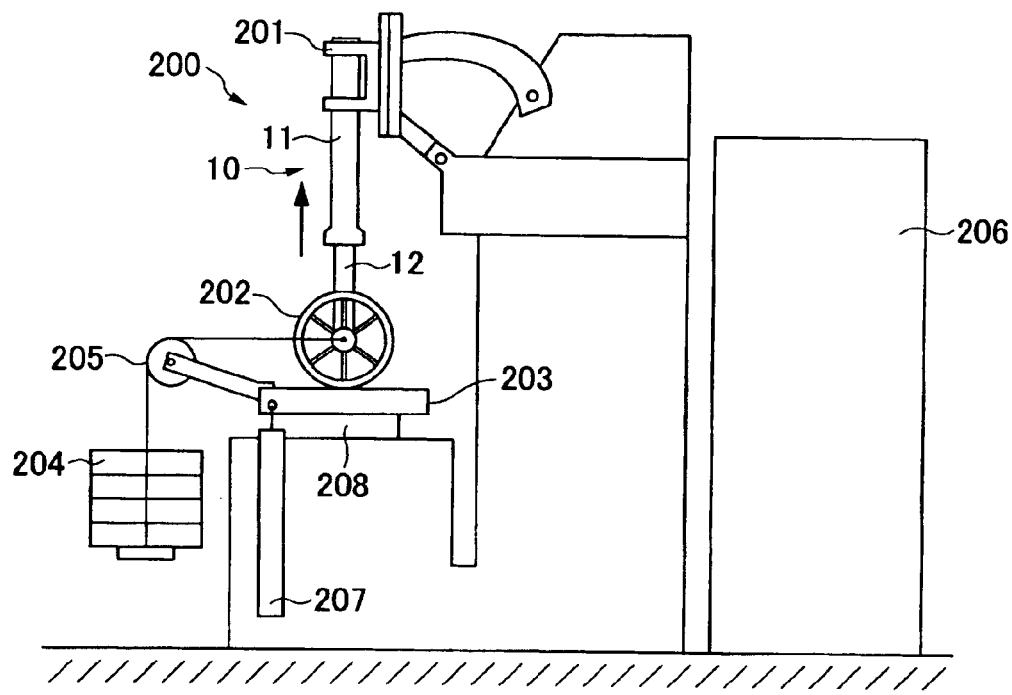
FIG. 16 is a schematic view showing a test apparatus for a friction characteristic.

FIG. 16 is a schematic view showing a test apparatus 200 for measuring a friction characteristic of the front fork 10. The test apparatus 200 is provided with a clamp jig 201 for holding the outer tube 11 of the front fork 10, and comprises an axle of an aluminum wheel 202 rotatably connected to the axle bracket 19 of the inner tube 12. The wheel 202 is mounted on a movable table 203. A weight 204 is applied to the axle of the wheel 202 connected to the axle bracket 19 of the inner tube 12. The weight 204 applies a side force to the outer tube 11 and the inner tube 12 from an axial perpendicular direction of the front fork 10 via a sheave 205 supported to the movable table 203. A control panel 206 controls an actuator (not shown) so as to elevate the movable table 203, and relatively moves the inner tube 12 to an upper side with respect to the outer tube 11 via the wheel 202 mounted on the movable table 203. A control panel 206 can detect a friction value between the bushes 15 and 16 of the outer tube 11 and the outer periphery of the inner tube 12 which is generated at each of the stroke positions of the inner tube 12 with respect to the outer tube 11, by means of a displacement gauge 207 and a load cell 208 provided in the actuator of the movable table 203.

Figure 7:
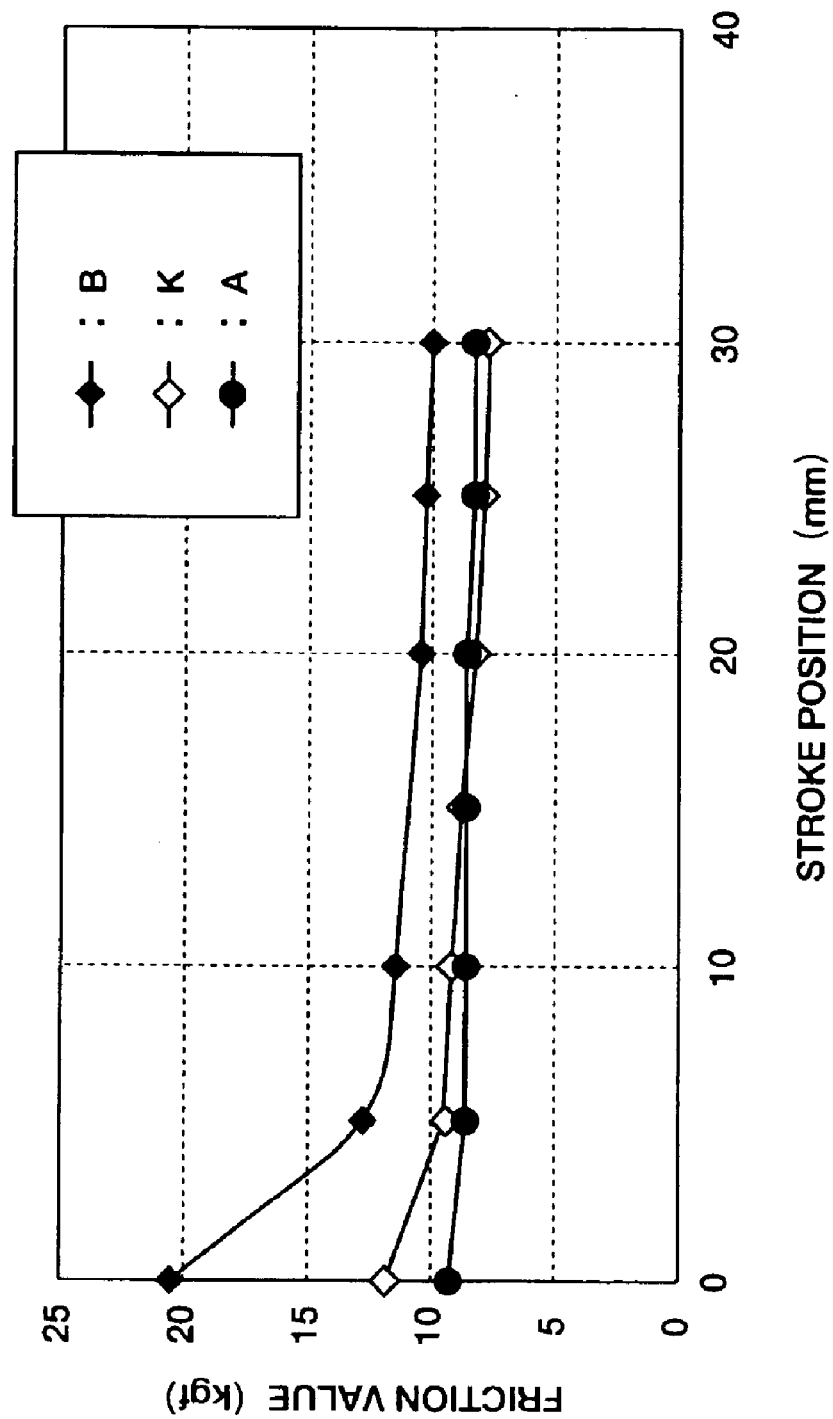
FIG. 7 is a graph showing a change in friction with respect to a stroke of the front fork.

An example A of the present invention in TABLE 1 and FIG. 7 shows a friction value A generated at each of the compression stroke positions from a starting time (zero compression stroke). In the case that a compression stroke of 30 mm from a riding 1G position (a state in which one passenger rides on the vehicle and the vehicle is at the rest) is applied to the outer tube 11 and the inner tube 12 under a state in which a side force of 150 kgf is applied to the outer tube 11 and the inner tube 12 from the axial perpendicular direction of the front fork 10 mentioned above by using the test apparatus 200. In example A of the present invention, a hard chromium plating is applied to the outer periphery of the inner tube 12, and the bush 15 employs a structure in which Teflon (trade mark) is coated on an inner periphery of a sintered metal.

A conventional example B and a comparative example K in TABLE 1 and FIG. 7 show friction values B and K generated at each of the compression stroke positions in the case that a compression stroke is applied to the outer tube 11 and the inner tube 12 under a state in which a side force is applied to the front fork in which the upper bush is attached to the attached portion open to the upper end side in the inner periphery of the upper portion of the outer tube 11 in a pressure fitting state. The lower bush is attached to the attached portion open to the lower end side in the inner periphery of the lower portion of the outer tube 11 in a pressure fitting state, by using the same test apparatus 200 as that in the example A of the present invention. In the conventional example B, a hard chromium plating is applied to the outer periphery of the inner tube 12, and the bush employs a structure in which Teflon (trade mark) is coated on an inner periphery of a sintered metal. In the comparative example K, an amorphous hard carbon membrane, called as DLC (Diamond Like Carbon) membrane, is coated to the outer periphery of the inner tube 12, and the bush employs a structure in which Teflon (trade mark) is coated on an inner periphery of a sintered metal.

TABLE 1

| Stroke | A | B | K |
|---|---|---|---|
| 0 | 9.25 | 20.5 | 11.75 |
| 5 | 8.5 | 12.75 | 9.25 |
| 10 | 8.5 | 11.375 | 9 |
| 15 | 8.5 | 10.875 | 8.5 |
| 20 | 8.5 | 10.375 | 8.125 |
| 25 | 8.25 | 10.25 | 8 |
| 30 | 8.25 | 10 | 7.75 |

In accordance with the present embodiment, the following operation and effects can be achieved.

(1) Since it is not necessary to apply the cutting operation to the long area extending along the inner periphery of the outer tube 11 in the axial direction from the upper end portion when forming the annular groove 71 for the upper bush 15, it is possible to reduce working time.

(2) Since the upper bush 15 is inhibited from moving in the axial direction in both end portions of the annular groove 71, the bush 15 is not displaced in the axial direction.

(3) Since the gap between the inner periphery of the outer tube 11 and the outer periphery of the inner tube 12 is made smaller than the thickness of the bush 15, the bush 15 does not fall away into the gap even when the bush 15 is compressed to an amount of the closed gap 15A.

(4) In the case of press fitting the bush to the conventional attachment portion in which one end side is open, the bush is press fitted such that the closed gap is zero. On the contrary, according to the present invention, the bush 15 is expanded within the annular groove 71 and generates the closed gap 15A. In accordance with the bush 15 on the basis of the present invention mentioned above, the friction with respect to the outer periphery of the inner tube 12 is constant from an initial time of starting the stroke, in comparison with the conventional pressure inserted bush having zero closed gap (FIG. 7). This is because of the following reason. It can be considered that since the bush 15 is not closely attached to the inner periphery of the annular groove 71, the bush 15 can be slightly expanded within the annular groove 71. So that friction at the initial starting time is reduced in comparison with the conventional press fitting bush. Since the friction is fixed, it is possible to improve working property of the front fork 10. In particular, since friction at the initial starting time is reduced, it is possible to improve initial working property of the front fork 10.

Figure 6A:
FIGS. 6A and 6B are front elevational views showing a modified example of the bush.

FIG. 6A shows a modified example of the bush 15, in which the closed gap 15A is formed to be inclined with respect to the axial direction of the bush 15.

In the bush 15 in FIG. 6A, the closed gap 15A is formed to be inclined with respect to the axial direction of the bush 15. As a result, the bearing surface of the bush 15 exists for all the area of the bush 15 in the peripheral direction. Accordingly, the portion which does not bear the outer peripheral surface of the inner tube 12 is increased in the peripheral direction of the bush 15, in comparison with the structure in which the closed gap extending along the axial direction is formed. It is possible to prevent scratches from being generated on the outer peripheral surface of the inner tube 12 on the basis of the sliding with the closed gap 15 of the bush 15.

Figure 6B:
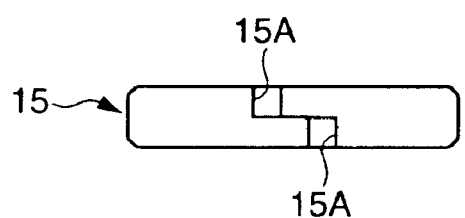

FIG. 6B shows a modified example of the bush 15, in which the closed gap 15A is formed in a step shape with respect to the axial direction of the bush 15.

Embodiment 2, FIGS. 8 to 15

Figure 8:
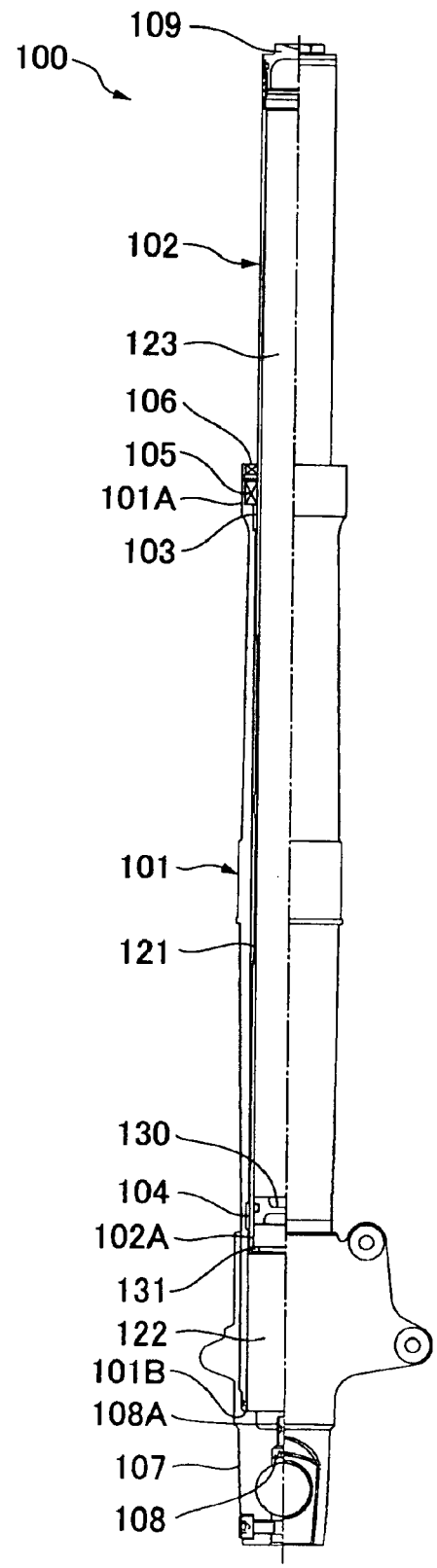
FIG. 8 is a half cross sectional view showing a most expanded state of the front fork.
Figure 9:
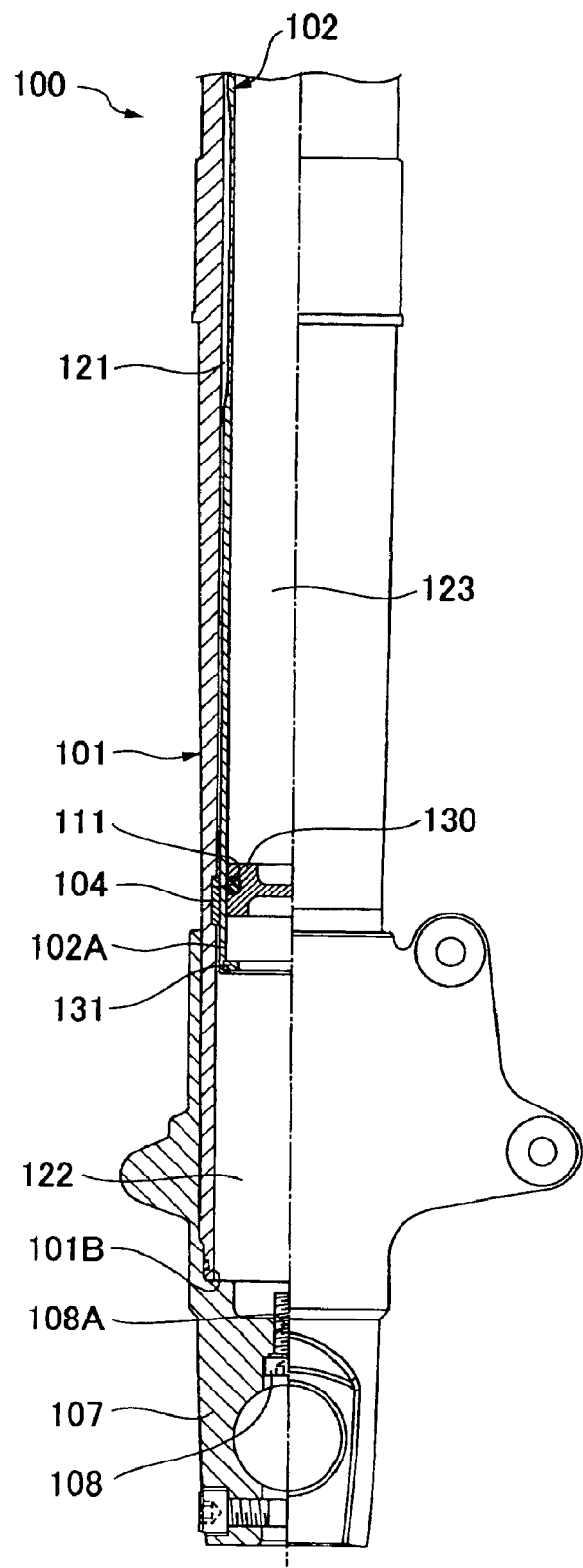
FIG. 9 is an enlarged view of a lower portion of the front fork in FIG. 8.
Figure 10:
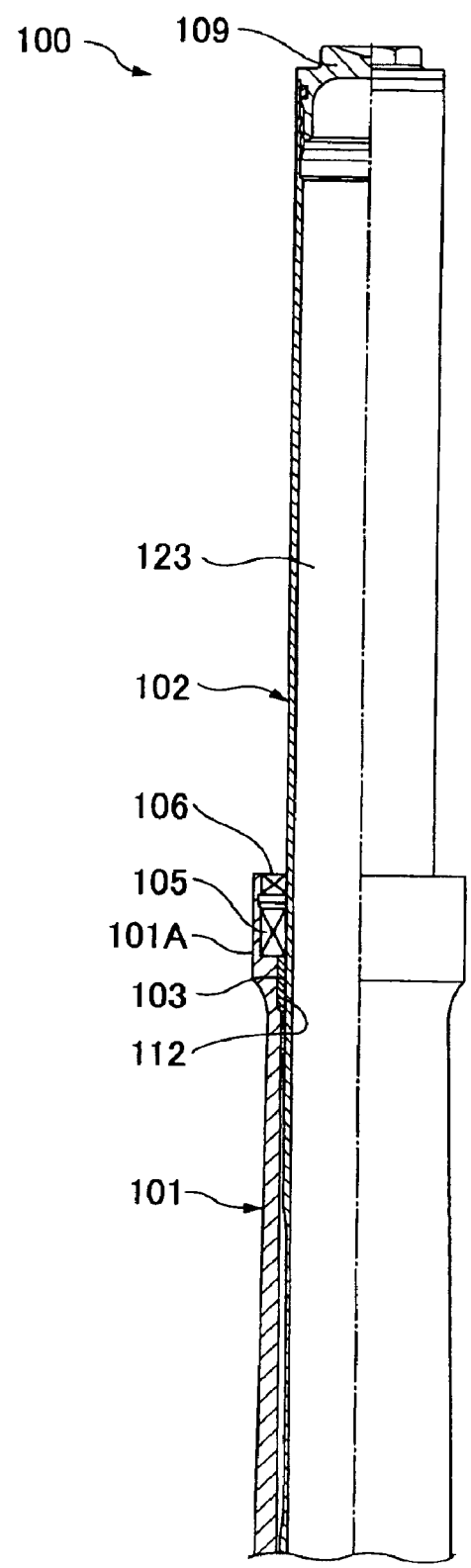
FIG. 10 is an enlarged view of an upper portion of the front fork in FIG. 8.

A normal type front fork 100 in a two-wheeled vehicle or the like comprises, as shown in FIGS. 8 to 10, an inner tube 102 in a side of a vehicle body slidably erected in an outer tube 101 in a side of an axle. The front fork 100 does not include a suspension spring and a damping force generating apparatus.

In the front fork 100, a leading end 102A of the inner tube 102 is inserted into the outer tube 101 from an upper end opening portion 101A of the outer tube 101. Further, two upper and lower bushes 103 and 104 guiding the inner tube 102 are fitted and inserted to two upper and lower positions in an inner periphery of the outer tube 101. In other words, an inner periphery is in a side of the upper end opening portion 101A of the outer tube 101, and an inner periphery is in a side of a base end which is spaced from the upper end opening portion 101A in an axial direction. An oil seal 105 and a dust seal 106 are fitted and attached to the upper end opening portion 101A of the outer tube 101.

A base end of the outer tube 101 is connected to the axle via an axle bracket 107, and the inner tube 102 is supported to a side of the vehicle body via upper and lower brackets (not shown).

A bolt hole 108A is provided in a bottom portion of the axle bracket 107 which is sealed in the base end of the outer tube 101. A sealing bolt 108 is attached to and detached from the bolt hole 108A. A cap 109 is sealed in the upper end opening portion (the base end) of the inner tube 102.

Figure 11:
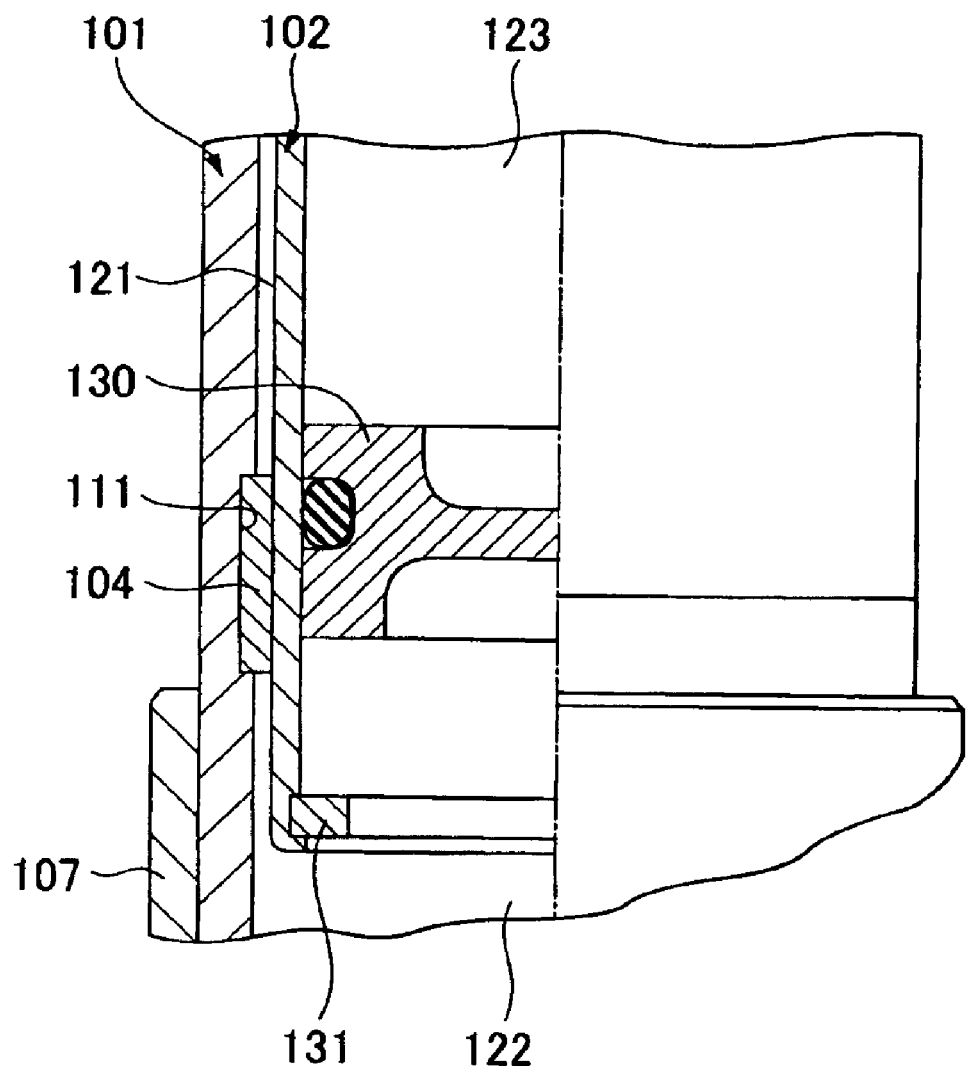
FIG. 11 is an enlarged view of a main portion in FIG. 9.
Figure 12A:
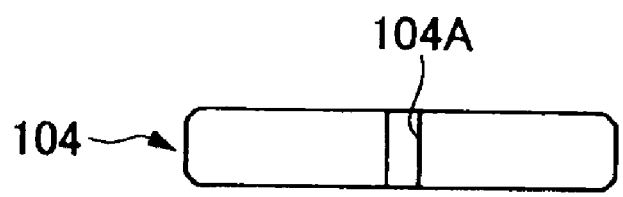
Figure 12B:
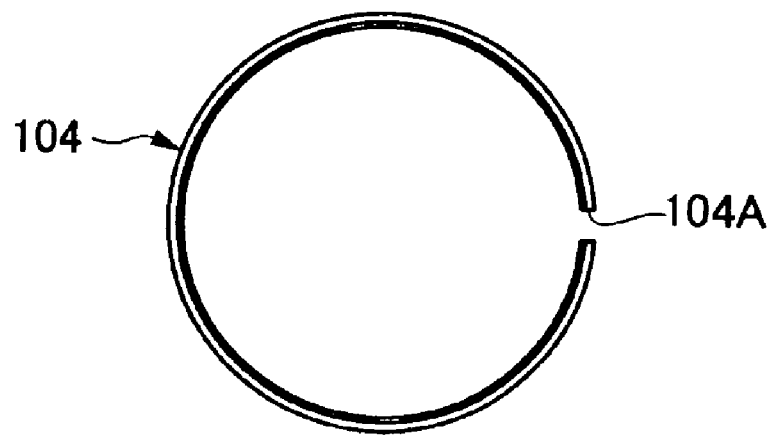

Accordingly, in the front fork 100, as shown in FIG. 11, an annular groove 111 is formed in an inner periphery of the lower end (the base end side) of the outer tube 101 in accordance with a cutting process. The annular lower bush 104 mentioned above is attached within the annular groove 111. The annular groove 111 is prevented from running out while working, by working the annular groove 111 from the side of the base end of the outer tube 101 in a state in which the axle bracket 107 is not screwed and fastened, whereby a precise annular groove 111 can be formed. The annular groove 111 comprises a recess groove in which both side portions in the axial direction are closed by a step, within the inner peripheral surface of the outer tube 101. The lower bush 104 comprises an annular body as shown in FIGS. 12A and 12B, and has a closed gap 104A formed in a straight shape extending along the axial direction of the bush 104 in a free state. The lower bush 104 is inserted from a lower end opening portion 101B of the outer tube 101 in an elastic contracted state with respect to the inner diameter of the outer tube 101, is elastically expanded with respect to a groove bottom of the annular groove 111 so as to be attached, and is attached to the annular groove 111 in a state having the closed gap 104A.

The lower bush 104 is expanded from a state in which the lower bush 104 is inserted to the inner diameter of the outer tube 101 at a degree of a difference between an inner peripheral length of the outer tube 101 and an inner peripheral length of the groove bottom of the annular groove 111, while the lower bush 104 is attached to the groove bottom of the annular groove 111. It is preferably that the smaller closed gap 104A is attached to the groove bottom of the annular groove 111.

In this case, the lower bush 104 is essentially round when the lower bush 104 is attached to the groove bottom.

In a state in which the front fork 100 is assembled, an annular gap between the inner periphery of the outer tube 101 and the outer periphery of the inner tube 102 is formed smaller than a thickness of the lower bush 104.

In this case, the upper bush 103 is attached to the attached portion 112 which is cut in the inner periphery in the side of the upper end opening portion 101A of the outer tube 101 so as to open an upper end side in a pressure inserted state, and the closed gap becomes zero.

Therefore, in accordance with the present embodiment, the following operations and effects can be achieved.

(1) Since it is not necessary to cut a long area along an axial direction from the upper end portion or the lower end portion in the inner periphery of the outer tube 101 in the case of forming the annular groove 111 for the lower bush 104, working time can be shortened.

The run-out of the outer tube 101 when forming the annular groove 111 in accordance with the cutting work is prevented by forming the annular groove 111 in the side of the base end of the outer tube 101 in the side of the base end as close as possible in the outer tube main body. It is thereby possible to precisely form the annular groove 111.

(2) Since the lower bush 104 is inhibited from moving in the axial direction in the both end portions of the annular gap 111, the bush 104 is not displaced in the axial direction.

(3) Since the gap between the inner periphery of the outer tube 101 and the outer periphery of the inner tube 102 is made smaller than the thickness of the bush 104, the bush 104 does not fall away into the gap even when the bush 104 is contracted at a degree of the closed gap 104A.

(4) In the case that the bush is pressure inserted to the conventional attached portion in which one end side is open, the bush is pressure inserted in such a manner that the closed gap of the bush is zero. On the other hand, in accordance with the present invention, the bush 104 is expanded within the annular groove 111, and the closed gap 104A is generated. In the bush 104 in accordance with the present invention mentioned above, the friction with respect to the outer periphery of the inner tube 102 becomes constant from an initial time of starting the stroke, in comparison with the conventional pressure inserted bush in which the closed gap is zero. Because it is considered that the bush 104 is not closely attached to the inner periphery of the annular groove 111, the bush 104 can be slightly expanded within the annular groove 111, so that the friction at the initial time of starting is reduced in comparison with that in the conventional pressure inserted bush. Since the friction becomes fixed, it is possible to improve operability of the front fork 100. In particular, since the friction at the initial time of starting is reduced, it is possible to improve initial operability of the front fork 100.

Figure 13:
FIG. 13 is a front elevational view showing a modified embodiment of the bush.

FIG. 13 shows a modified example of the bush 104, in which the closed gap 104A is formed so as to be inclined with respect to the axial direction of the bush 104.

In the bush 104 in FIG. 13, the closed gap 104A is formed so as to be inclined with respect to the axial direction of the bush 104. As a result, the bearing surface of the bush 104 exists in all the area in the peripheral direction of the bush 104. Accordingly, a portion which does not bear the outer peripheral surface of the inner tube 102 is lost in the peripheral direction of the bush 104, in comparison with the structure forming the closed gap along the axial direction. It is thereby possible to prevent the scratch from being generated on the outer peripheral surface of the inner tube 102, on the basis of the sliding motion with the closed gap 104A of the bush 104.

Further, in the front fork 100, the bushes 103 and 104 and the lubricating oil of the oil seal 105 can be charged to the annular gap sectioned by two upper and lower bushes 103 and 104 between the inner periphery of the outer tube 101 and the outer periphery of the inner tube 102. The annular gap is formed as an annular oil gap 121.

Further, a movable partition wall member 130 is provided in the inner periphery of the inner tube 102. The movable partition wall member 130 is provided with an oil chamber 122 which is sectioned together with the inner periphery of the outer tube 101 and a bottom portion of the axle bracket 107, in the side of the leading end of the inner tube 102, and sections a gas chamber 123 in the side of the base end of the inner tube 102. In the present embodiment, the movable partition wall member 130 is provided in the inner periphery in the side of the leading end of the inner tube 102, and makes volumetric capacity of the oil chamber 122 relatively small.

The movable partition wall member 130 comprises a free piston sliding along the inner periphery of the inner tube 102 in a liquid tight manner, however, may be constituted by a bladder made of a rubber or the like and having an outer edge sealed in the inner periphery of the inner tube 102.

Figure 14:
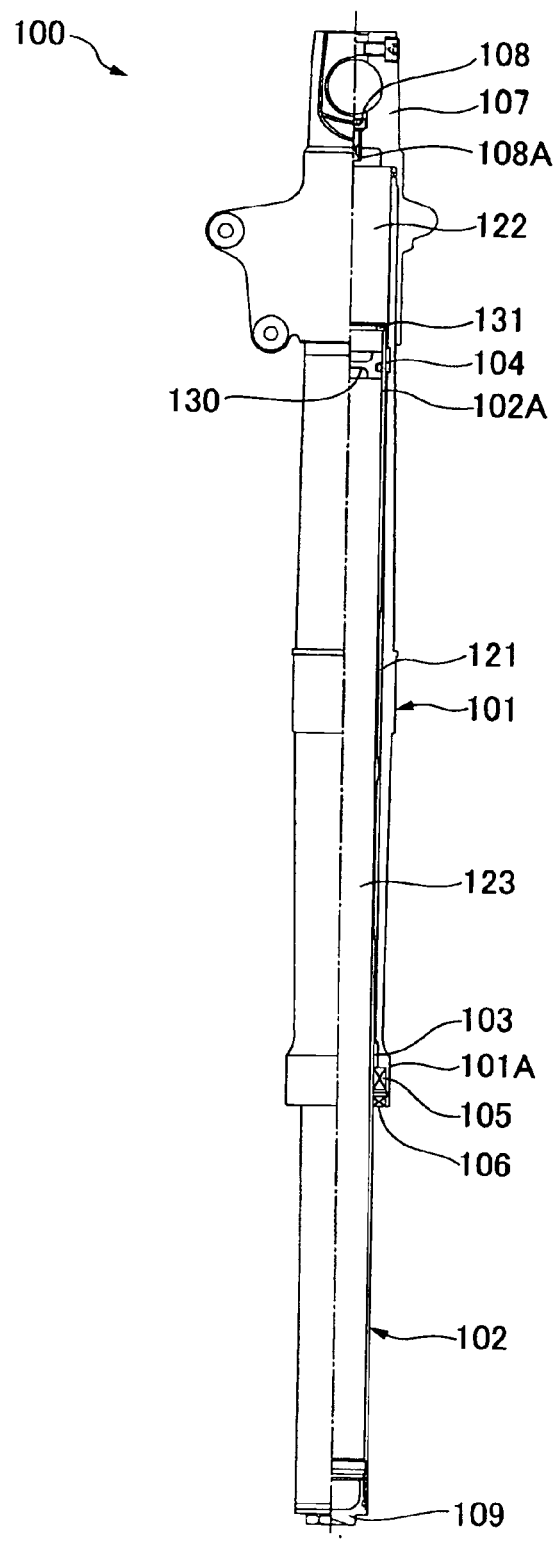
FIG. 14 is a half cross sectional view showing a state of filling oil in the front fork.
Figure 15:
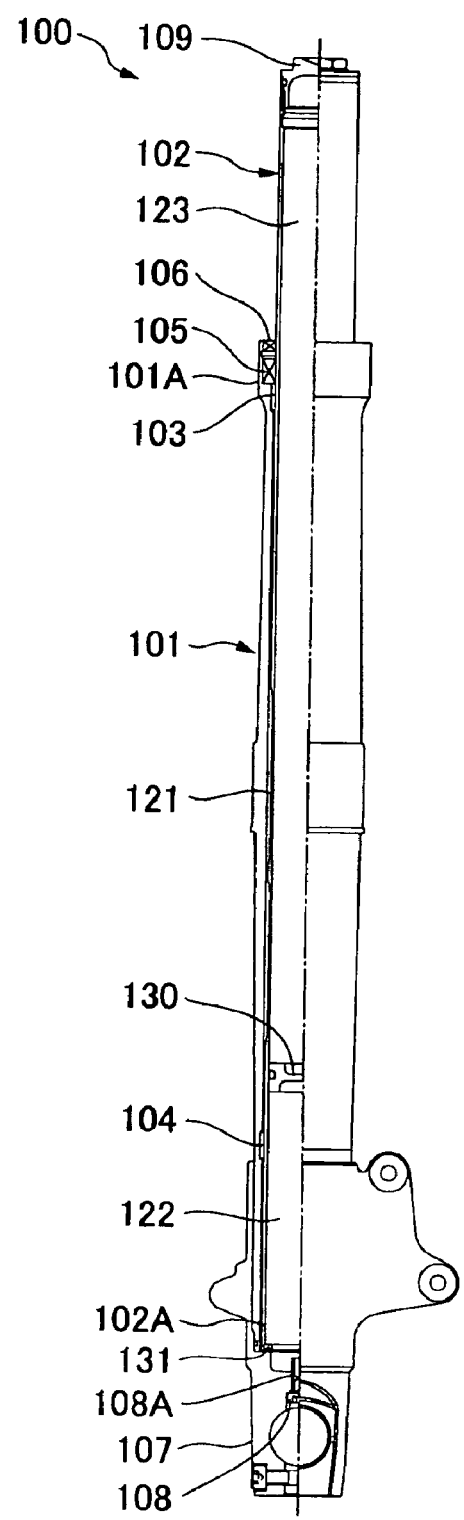
FIG. 15 is a half cross sectional view showing the most compressed state of the front fork.

When injecting the oil to the front fork 100, as shown in FIG. 14, the front fork 100 is inverted in such a manner as to arrange the outer tube 101 in the upper side and arrange the inner tube 102 in the lower side. The oil is injected to the oil chamber 122 from the bolt hole 108A of the axle bracket 107 in a state in which the movable partition wall member 130 is applied and fastened to a stopper 131 provided in the leading end portion in the inner periphery of the inner tube 102. Thereafter a sealing bolt 108 is sealed in the bolt hole 108A. When the outer tube 101 and the inner tube 102 are expanded and contracted in a normal erect state of the front fork 100, the movable partition wall member 130 moves upward from the stopper 131 at a degree of the volumetric capacity at which the inner tube 102 moves forward into the oil chamber 122. FIG. 15 shows a maximum compression state of the front fork 100.

At this time, the front fork 100 communicates the annular oil gap 121 between the outer tube 101 and the inner tube 102 with the oil chamber 122 in the side of the leading end of the inner tube 102, and sections the annular oil gap 121 and the oil chamber 122 with respect to the gas chamber 123 in a sealing manner by the movable partition wall member 130. In the present embodiment, the annular oil gap 121 is always communicated with the oil chamber 122 via the closed gap 104A of the lower bush 104 mentioned above.

Therefore, in accordance with the present embodiment, the following operations and effects can be achieved.

(a) The movable partition wall member 130 sections in a sealing manner the annular oil gap 121 between the outer tube 101 and the inner tube 102 and the oil chamber 122 in the lower portion of the movable partition wall member 130, pressing down with respect to the gas chamber 123 in the upper portion of the movable partition wall member 130 so as to make the volumetric capacity relatively small. The oil attached to the outer periphery of the inner tube 102 and making an intrusion into the annular oil gap 121 lubricates the upper bush 103 and the lip of the oil seal 105 in accordance with the vertical motion of the inner tube 102. Further, the oil fully filling the annular oil gap 121 directly lubricates the bushes 103 and 104. The movable partition wall member 130 executes a volume compensation and a temperature compensation in accordance with the forward and backward movement of the leading end of the inner tube 102 to the oil chamber 122 on the basis of the vertical movement thereof.

The movable partition wall member 130 comprises the free piston or bladder made of the rubber or the like. However, it is inexpensive because of a general-purpose product, as is different from a specially ordered product such as a hollow molded product comprising synthetic resin pipe or the like in accordance with the prior art.

As a result, it is possible to inexpensively provide the front fork 100 which can make the volumetric capacity of the gas chamber 123 larger by making the volumetric capacity of the lower oil chamber 122 smaller by the movable partition wall member 130. Also, this structure can reduce an extra oil amount, can reduce the filling amount of the lubricating oil for lubricating the bush 103 in the opening portion 101A of the outer tube 101, the oil seal 105 and the like, and can save weight.

(b) Since the movable partition wall member 130 is provided in the inner periphery in the side of the leading end of the inner tube 102, it is possible to make the volumetric capacity of the lower oil chamber 122 of the movable partition wall member 130 smaller, and it is possible to achieve a lighter structure.

(c) Since the closed gap 104A of the bush 104 originally provided in the inner periphery of the outer tube 101 is utilized as the communication passage between the annular oil gap 121 and the leading end side oil chamber 122 of the inner tube 102, it is possible to make the front fork 100 mentioned in the items (a) and (b) less expensive.

In this case, in the front fork 100, the annular oil gap 121 and the oil chamber 122 may be always communicated with each other by the oil hole provided in the side wall of the inner tube 102. In this case, in the most extended state of the inner tube 102 shown in FIG. 8, since the movable partition wall member 130 moves downward at a degree that the inner tube 102 gets out of the oil chamber 122, it is necessary that the oil hole is provided in a position in a side of the leading end of the inner tube 102 in which the inner tube 102 is not closed by the movable partition wall member 130 and is not open to the gas chamber 123.

Further, in the front fork 100, the structure is not limited to the front fork in which the oil is filled in the annular oil gap 121 between the outer tube 101 and the inner tube 102. However, a slight amount of gas may be mixed into the oil within the annular oil gap 121. In the case that the gas is mixed into the annular oil gap 121, the working fluid flows in the closed gap 104A of the bush 104 in accordance with the expansion and contraction stroke of the inner tube 102. Accordingly, the damping force is generated in the closed gap 104A, and the operability of the inner tube 102 is deteriorated. In the case that the gas is not mixed into the annular oil gap 121, the damping force mentioned above is not generated, and the operability in the expansion and contraction stroke of the inner tube 102 is improved.

Further, the front fork 100 may employ the outer tube 101 obtained by integrally forming the axle bracket 107 in the outer tube main body comprising the outer tube 101 in accordance with a casting.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A normal type front fork usable In a two-wheeled vehicle comprising an attachment portion for a bush guiding an inner tube in a side of a vehicle body disposed in upper and lower sides of an inner periphery of an outer tube in a side of an axle, an annular groove in which both end portions in an axial direction are closed is disposed in a lower inner periphery of the outer tube, an annular bush having a closed gap in a free state is attached to the annular groove, wherein an annular gap between an inner periphery of the outer tube and an outer periphery of the inner tube is smaller in dimension than a thickness of the bush.

2. A normal type front fork usable in a two-wheeled vehicle according to claim 1, wherein the closed gap of the bush is inclined with respect to an axial direction of the bush.

3. A normal type front fork usable in a two-wheeled vehicle according to claim 1, wherein the closed gap of the bush is a straight shape extending along an axial direction of the bush.

4. A normal type front fork usable in a two-wheeled vehicle according to claim 1, wherein the closed gap of the bush is a step shape with respect to an axial direction of the bush.

5. A normal type front fork usable In a two-wheeled vehicle according to claim 1, wherein the annular groove comprise a recess groove in which both end portions in the axial direction are closed by a step portion, in an inner peripheral surface of the outer tube.

* * * * *